(12) United States Patent
Pierce et al.

(10) Patent No.: US 6,745,175 B2
(45) Date of Patent: Jun. 1, 2004

(54) SYSTEM AND METHOD FOR A SHARED MEMORY ARCHITECTURE FOR HIGH SPEED LOGGING AND TRENDING

(75) Inventors: David Mark Pierce, Austin, TX (US); Maxim Mark Tomashevsky, Austin, TX (US); Anthony George Roach, Indianapolis, IN (US)

(73) Assignee: National Instruments Corporation, Austin, TX (US)

( * ) Notice: Subject to any disclaimer, the term of this patent is extended or adjusted under 35 U.S.C. 154(b) by 386 days.

(21) Appl. No.: 09/920,982

(22) Filed: Aug. 2, 2001

(65) Prior Publication Data

US 2003/0028552 A1 Feb. 6, 2003

(51) Int. Cl.[7] .............................................. G06F 17/30
(52) U.S. Cl. .............................................. 707/2; 707/3
(58) Field of Search .............................. 707/2, 4, 6, 10, 707/104.1, 206.3; 379/265.03; 600/483, 513; 700/17; 711/153

(56) References Cited

U.S. PATENT DOCUMENTS

| | | | |
|---|---|---|---|
| 5,546,455 A | * | 8/1996 | Joyce et al. ............ 379/265.03 |
| 5,893,097 A | | 4/1999 | Hayata et al. |
| 5,918,229 A | * | 6/1999 | Davis et al. ................... 707/10 |
| 6,599,250 B2 | * | 7/2003 | Webb et al. ................. 600/483 |

\* cited by examiner

*Primary Examiner*—Diane D. Mizrahi
*Assistant Examiner*—Apu M Mofiz
(74) *Attorney, Agent, or Firm*—Meyertons Hood Kivlin Kowert & Goetzel, P.C.; Jeffrey C. Hood

(57) ABSTRACT

An improved method and system for high speed logging and trending of data. Logging of data may include: receiving data; and storing the data, and an index to the data, in a shared memory location coupled to a database. Trending of data may include: retrieving requested data from the shared memory location using the index of the requested data, and displaying the retrieved data. User configurable frequencies may be provided for various actions on the data. The data may be measurement data, including a stream of data comprising a plurality of entries. The logging and trending may be: (1) performed substantially concurrently; (2) implemented using shared memory templates. The database may reside on a first computer system, and the logging and trending may be performed on the first computer system or on a second computer system coupled to the first computer system via a network.

21 Claims, 6 Drawing Sheets

SYSTEM AND METHOD FOR A SHARED MEMORY ARCHITECTURE FOR HIGH SPEED LOGGING AND TRENDING

BACKGROUND OF THE INVENTION

1. Field of the Invention

The present invention relates to computer software, and more particularly to a high speed method of logging and trending data.

2. Description of the Related Art

Logger application programs (e.g., LabVIEW, a National Instruments product) may be configured to repeatedly read data from an input device (for example, 100 times per second e.g., by reading the latest 10 milliseconds' worth of data from a data acquisition (DAQ) device) and subsequently write the data to an output device (e.g., a database).

Trender application programs (e.g., the Historical Viewer in Measurement & Automation Explorer (MAX), a National Instruments product) may be configured to repeatedly read data from a stored location (e.g., a database) and subsequently display the data on a display device.

Users of currently available logging and trending application programs typically experience a delay between the logging of data by a logging application and the availability of the logged data for retrieval and display by a trending application. Existing logging and trending application programs typically utilize a file-based system or a traditional relational database. The trender application program must wait to read the logged data at least the length of time required for the logger application program to write the data to an output device, e.g., a file-based system; a traditional relational database; or early versions of a Citadel database (a National Instruments product).

It is desirable to provide real-time access to logged data, so that users of the logged data may evaluate and/or respond to the logged data more quickly than currently possible. As used herein, "real-time" indicates a response to stimuli within some relatively small upper limit of response time (e.g., milliseconds or seconds or minutes). "Real-time" may also refer to a response substantially as the user is watching.

For the foregoing reasons, there is a need for a system and method for high speed logging and trending of data.

SUMMARY OF THE INVENTION

The present invention provides various embodiments of a system, method, and medium for high speed logging and trending of data.

In one embodiment, data desired to be written or logged to the database may be received, wherein the database may be stored on a non-volatile memory. The received data may be initially stored in a shared memory location coupled to the database wherein the shared memory location may be in a volatile memory. A dynamic link library (DLL) associated with the database may store the data in the shared memory location. The dynamic link library associated with the database may also store (in the shared memory location) and/or update an index to the data. The data and an index to the data may each be stored in the shared memory location. The received data may also include a stream of data comprising a plurality of entries. Thus, storing an index to the received data may include storing an index for each of the plurality of entries as the entries are received and stored.

A requestor may submit a query for requested data residing in the database (e.g., at least a subset of the data in the database). This query may be processed by the database system. This request for data may be referred to as trending. The processing may include: receiving the query from the requestor for the requested data residing in the database; determining the location of the requested data in the shared memory using the index of the requested data; accessing the requested data from the shared memory; and providing or displaying the requested data to the requestor.

The received data may be live data acquired from a data acquisition device. Additionally, the received data may be one of any number of types of data (e.g., waveform data, single-point data, alarm data, event data). The received data may be any type of measurement data acquired from a measurement device.

The rate or frequency at which the received data is received may be at a first user configurable frequency. Similarly, the rate or frequency at which the received data is stored may be at a second user configurable frequency. The first user configurable frequency for receiving and the second user configurable frequency for storing may be an identical value. For example, the user may enter one value (i.e., either the first user configurable frequency for receiving or the second user configurable frequency for storing), and, by default, the unspecified frequency (i.e., the second user configurable frequency for storing if the first user configurable frequency for receiving is specified, or the first user configurable frequency for receiving if the second user configurable frequency for storing is specified) may be assigned the value entered for the specified frequency. The rate or frequency at which the requested data is provided or displayed may be at a third user configurable frequency.

The logging and trending may be performed substantially concurrently. Additionally, the logging and trending may be implemented using one or more shared memory templates.

The database may reside on a first computer system, and the logging and trending may be performed on the first computer system. Alternatively, the database may reside on a first computer system, and the logging and trending may be performed on a second computer system coupled to the first computer system via a network. The database, the logging application program, and the trending application program, may each reside on either of the first computer system or the second computer system, in any combination, as the network allows for communication between the computer systems.

BRIEF DESCRIPTION OF THE DRAWINGS

A better understanding of the present invention can be obtained when the following detailed description of several embodiments is considered in conjunction with the following drawings, in which.

Figure 1:
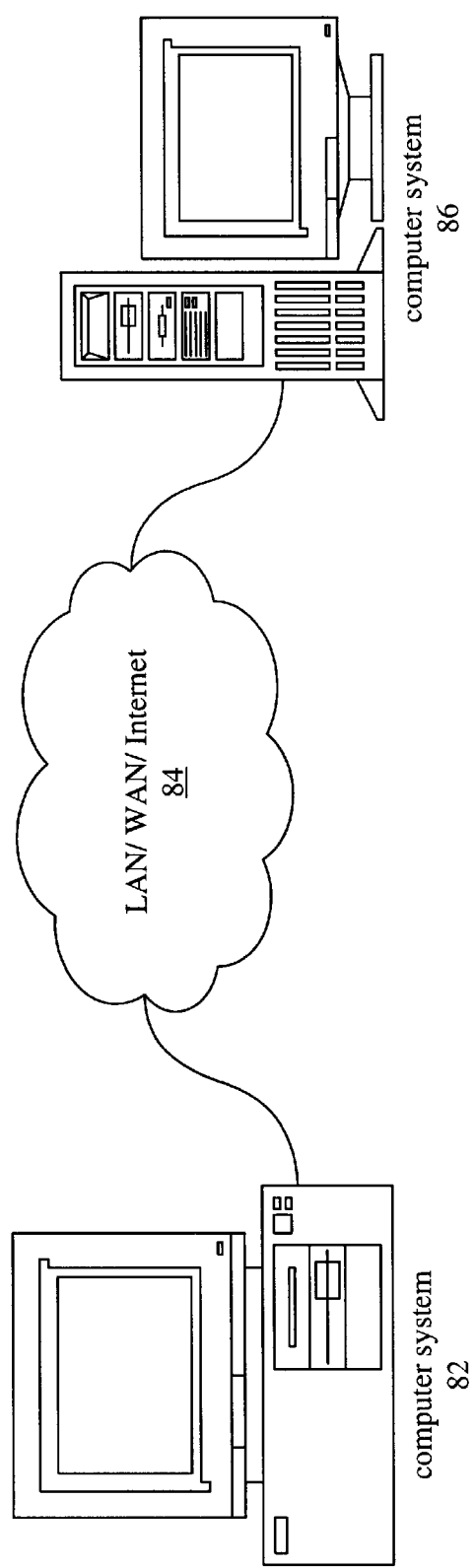
FIG. 1 illustrates a computer system connected through a network to a second computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), a WAN (wide area network), or the Internet, among others.

The computer system 82 includes or stores a first client computer program operable to log data and a second client computer program operable to trend data. In one embodiment, the data used in the logging application program and the trending application program may be of various types, as described below. The data used in the logging application program and the trending application program may reside in a database on the computer system 82 or on the second computer system 86.

The logging application program and the trending application program may be implemented in any of various ways, including procedure-based techniques, component-based techniques, and/or object-oriented techniques, among others. The programs may be written using any combination of text-based or graphical programming languages. Also, the programs may be written using distributed modules or components so that the logging application program, the trending application program, and the database may reside on any combination of computer system 82, computer system 86, and other computer systems connected to the network 84.

Figure 2A:
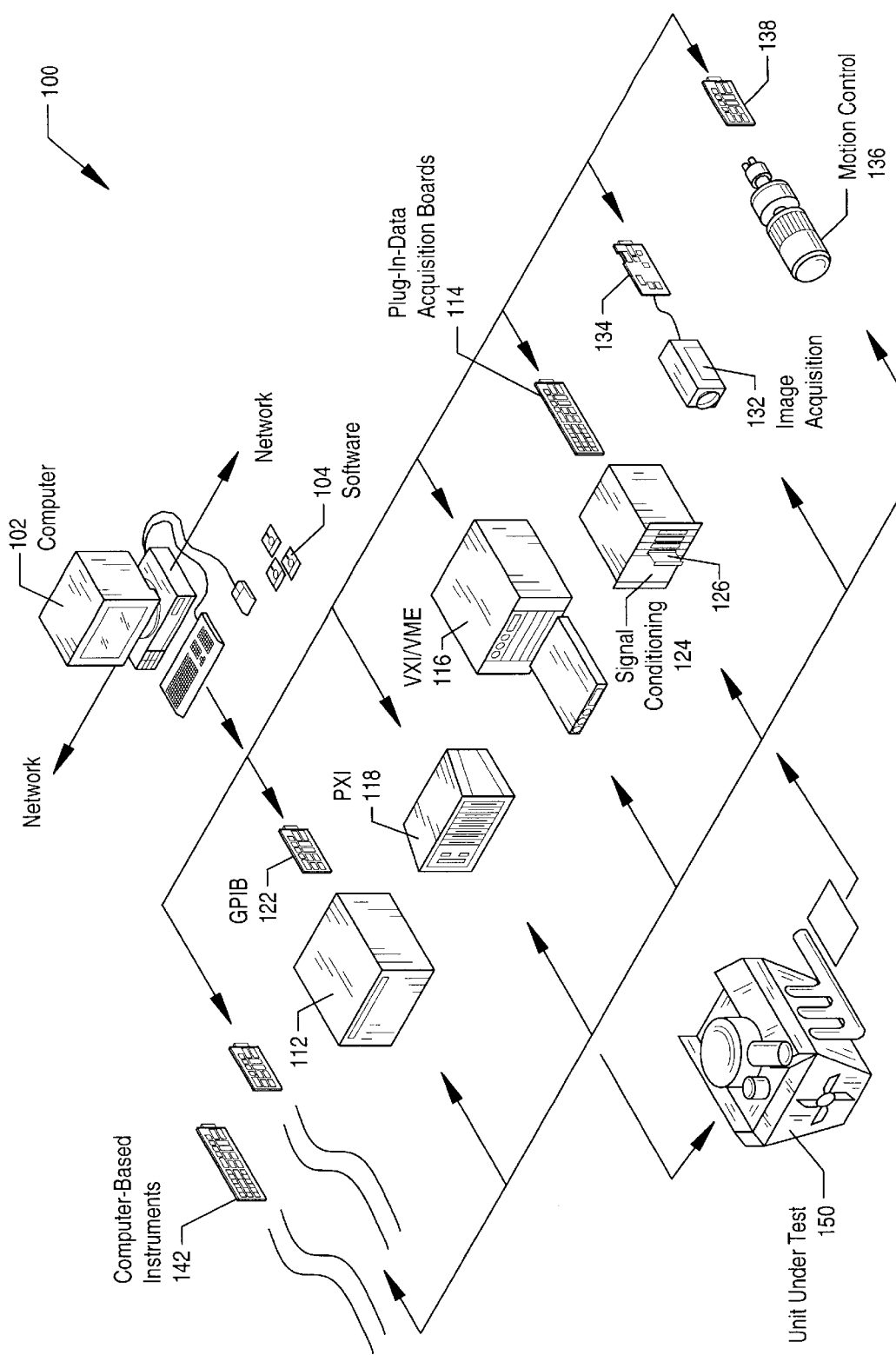
FIGS. 2A and 2B illustrate representative instrumentation and industrial automation systems including various I/O interface options.
Figure 2B:
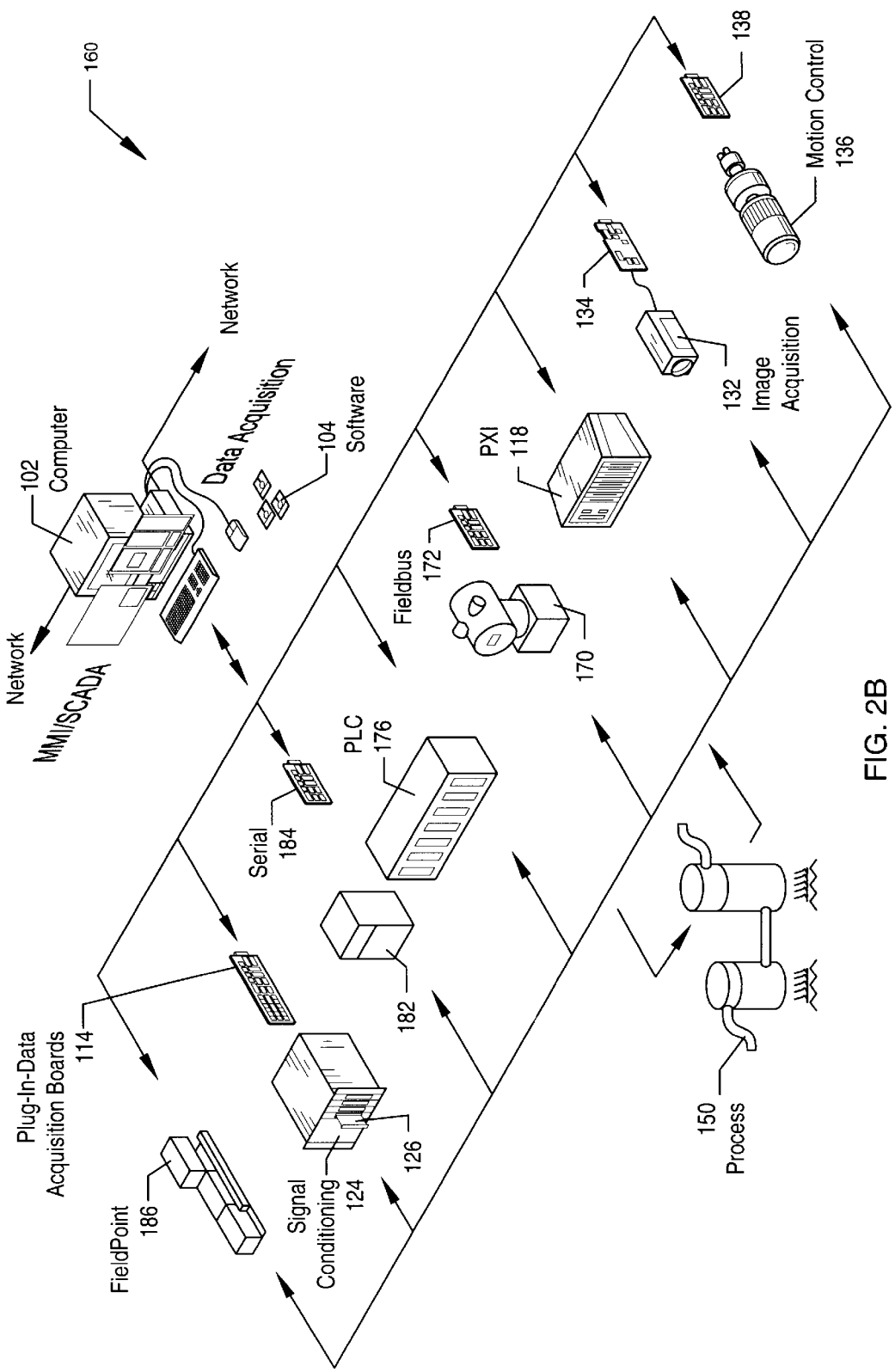

FIGS. 2A and 2B: Instrumentation and Industrial Automation Systems

FIGS. 2A and 2B illustrate exemplary systems which may store or use logging application programs and trending application programs for high speed logging and trending, or other purposes. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure, or control a unit under test (UUT) or process 150. The host computer 102 may store logging application programs and trending application programs for high speed logging and trending of data acquired from the one or more instruments. In other words, the computer 102 may be either of computers 82 or 86.

The one or more instruments may include a GPIB instrument 112 and associated GPIB interface card 122, a data acquisition (DAQ) board 114 and associated signal conditioning circuitry 124, a VXI/VME chassis or instrument 116, a PXI chassis or instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises a SCXI (Signal Conditioning eXtensions for Instrumentation) chassis comprising one or more SCXI modules 126.

The GPIB interface card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI/VME chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument 118 is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store logging application programs and trending application programs for high speed logging and trending of data acquired from the automation system 160. In other words, the computer 102 may be either of computers 82 or 86.

The one or more devices may include a data acquisition (DAQ) board 114 and associated signal conditioning circuitry 124, a PXI chassis or instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system 186 available from National Instruments, among other types of devices.

The DAQ card 114, the PXI chassis 118, the image acquisition card 134 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the logging application programs and trending application programs for high speed logging and trending of data are designed for data acquisition/generation, analysis and/or display. For example, in one embodiment, the logger application program is the National Instruments LabVIEW graphical programming environment application, which provides specialized support for developers of instrumentation and industrial automation applications. An example of a trender application program is the Historical Viewer in Measurement & Automation Explorer (MAX), a National Instruments product.

However, it is noted that the present invention can be used for a plethora of applications and is not limited to instrumentation or industrial automation applications. In other words, FIGS. 2A and 2B are exemplary only, and logger/trender programs for any of various types of purposes may be used, where the logger/trender programs are stored in and execute on any of various types of systems.

Figure 3:
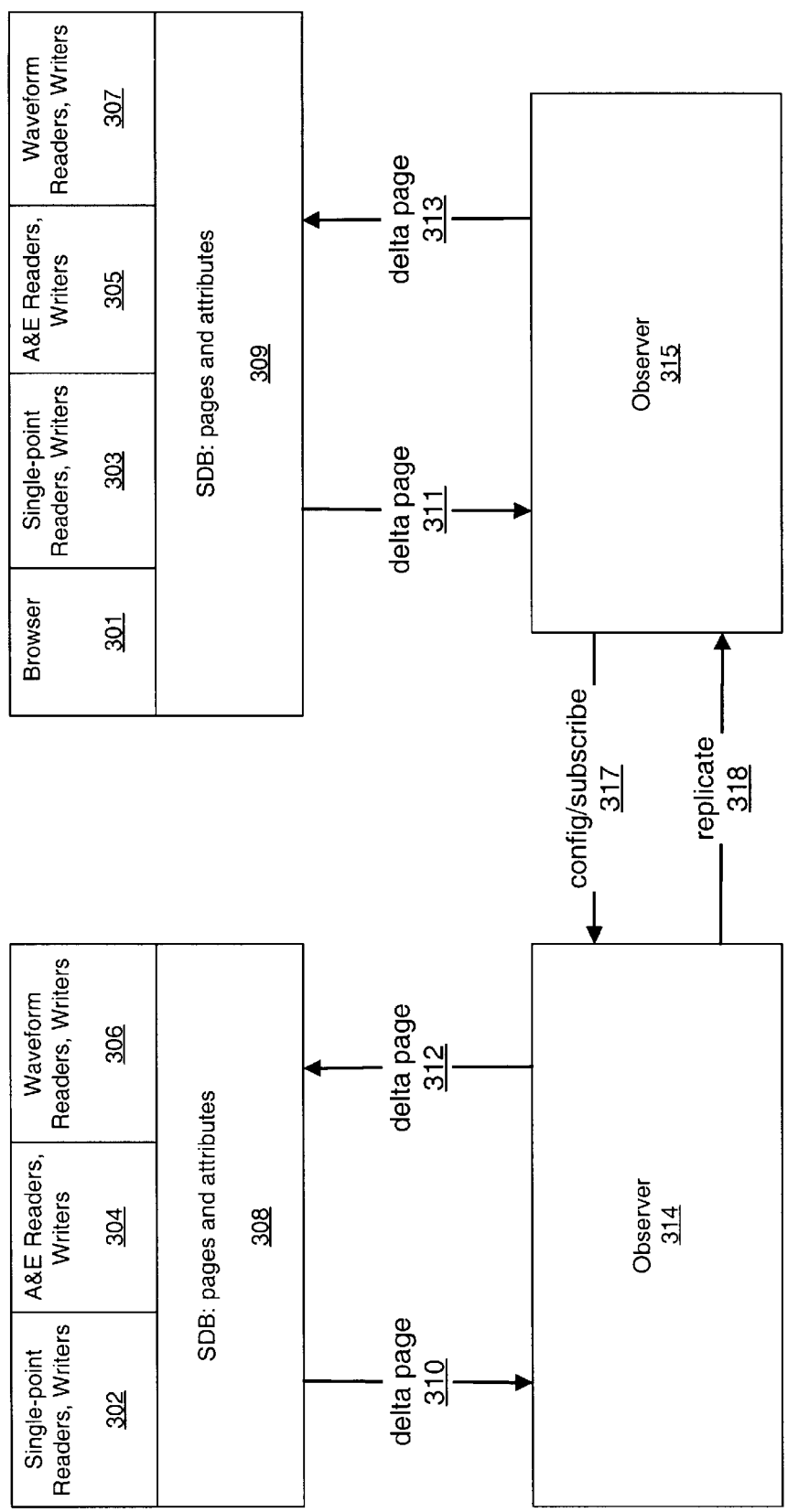
FIG. 3 is a block diagram illustrating an overall architecture of a shared memory architecture for high speed logging and trending, according to one embodiment.

FIG. 3: Overall Architecture

FIG. 3 illustrates one embodiment of a block diagram illustrating an overall architecture of a shared memory architecture for high speed logging and trending.

As used herein, logging refers to writing data and trending refers to reading and displaying data. As used herein, "alarm and event (A & E) data" are types of data that a subsystem, e.g., an alarm subsystem, stores (e.g., events, alarm-set events, alarm-reset events, alarm acknowledgement events).

As used herein, "alarm data" may be a stream of occurrences where each occurrence may be one of three types: set, clear, or acknowledge. Set occurrences may include: a name, a timestamp, a priority, a user (i.e., name of the person logged in when the alarm occurred), an area (i.e., name that may be used to organize alarms into groups), and a description. Clear occurrences may include: a name, a timestamp, and a user (i.e., name of the person who was logged in when the alarm cleared). Acknowledge occurrences may include: a name, a timestamp, a user (i.e., name of the person acknowledging the alarm), and a comment (e.g., a string describing why the alarm occurred and how it was dealt with). As used herein, "event data" may be a stream of event occurrences where each event occurrence may include: a name, a timestamp, a user (i.e., name of the person logged in when the event occurred), and a description.

As used herein, "attribute data" may include a set of attributes or name-value pairs associated with each trace in a streaming database (SDB). As used herein, "process data" is a type of data for which values change slowly. When a value change that is more than a user-specified threshold is detected, the changed value and a timestamp are logged. As used herein, "single-point data" is a type of data that is acquired asynchronously from one or more input channels and logged as a stream of value-timestamp pairs. As used herein, "waveform data" is acquired synchronously and stored using an initial timestamp and which may include a time interval representing the time between successive points.

As used herein, an "observer" is a component that keeps streaming databases (SDBs) on different computers synchronized with each other. As used herein, a "reader" is a software program or object, e.g., a filter object, for reading data of various types. As used herein, a "writer" is a software program or object, e.g., a filter object, for writing data of various types. As used herein, a "streaming database" (SDB) is a component that stores sub-traces or streams of data, or arrays of bytes, into sequences of a certain page size, such as 4 KB pages, in a shared memory or on a disk. The pages of changes may be referred to as delta pages. As used herein, a "delta page" is a structure that represents the difference between the current state of a page in a client's cache and the current state of the page in the server's database.

As shown in FIG. 3, single-point writers 302 and 303 may be used to log value-timestamp pairs. Similarly, single-point readers 302 and 303 may be used to display previously logged data.

Alarm and event (A&E) writers 304 and 305 may be used to log events (e.g., alarm set events, reset events, acknowledge events). A&E readers 304 and 305 may be used to determine when an alarm has been acknowledged. A&E readers 304 and 305 may also be used to read events, to be stored in a database (e.g., a relational database).

Waveform writers 306 and 307 may be used to write high-speed data (e.g., up to millions of samples per second, or at a rate of up to 250 kHz). Waveform readers 306 and 307 may be used to retrieve and display data.

As used herein, a "shared memory template" is a data structure, such as a C++ construct. A "shared memory template" may be functionally similar to the map template in the C++ standard template library. Shared memory templates may store data such that the data may be safely shared among multiple processes. A browser 301 may expose shared memory templates for users to enable browsing of data in both a local SDB 309 and remote SDBs (e.g., SDB 308). A user may build upon the shared memory templates exposed by the browser 301 to allow multiple types of data to be browsed. The shared memory templates may allow the type of data to browse to be user configurable.

A streaming database (SDB) 308 or 309 may be a shared-memory database including sub-traces (e.g., collections of 4 KB pages or delta pages) and associated attributes of the sub-traces. From an SDB's perspective, the previously mentioned writers and readers (e.g., 302 through 307) deal with delta pages.

Observers 314 or 315 may be responsible for remote browsing, replication, configuration and/or subscribing, and networking. An observer may read a delta page and modified attributes from a source SDB, and may subsequently send the delta page to a client observer. For example, observer 314 may read a delta page 310 and modified attributes from a source SDB 308 and may subsequently send or replicate 318 the delta page to a client observer 315. Similarly, observer 315 may read a delta page 311 and modified attributes from a source SDB 309 and may subsequently configure or subscribe 317 the delta page to a client observer 314. The client observer may write delta pages and modified attributes to a local SDB. Thus, observer 314 may write delta pages 312 to SDB 308 and observer 315 may write delta pages 313 to SDB 309.

Figure 4:
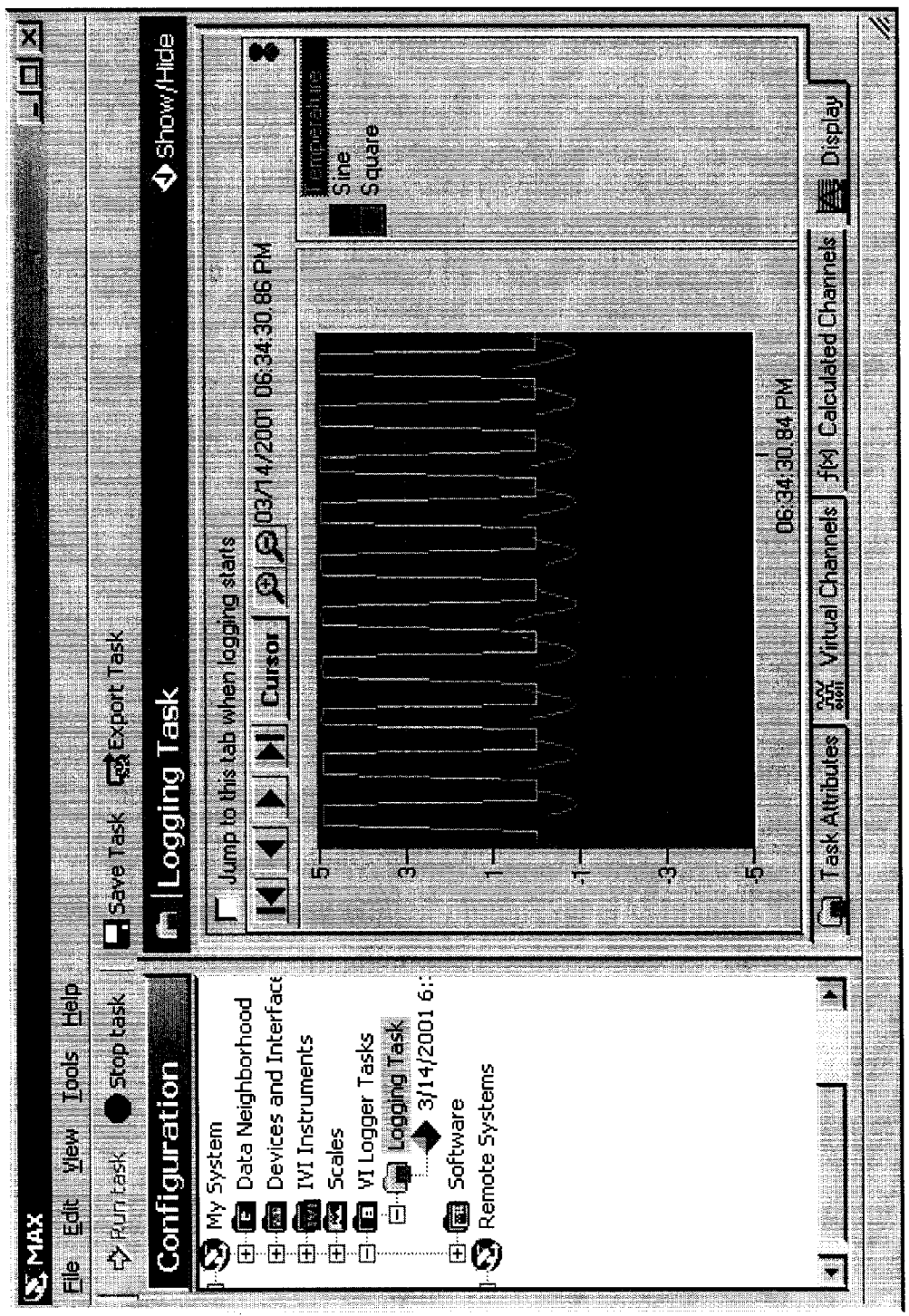
FIG. 4 is a screen shot of high speed trending, according to one embodiment.

FIG. 4: Screen Shot of High Speed Trending

One embodiment of a trender application program (i.e., the Historical Viewer in Measurement & Automation Explorer (MAX), a National Instruments product) is shown in FIG. 4. The MAX program may be configured to repeatedly read data from a stored location (e.g., a shared memory location) and subsequently display the data on a display device. Later data may be continuously logged to the storage location at the same time that earlier data is displayed to the user.

As shown in FIG. 4, a logging task is displayed. Acquisition of data may be user configured to start in response to an analog trigger or a digital trigger. Additional user configurable options may include: (1) start and stop data acquisition at user specified times; (2) publish acquired data to a data socket; (3) define and log virtual channels; (4) define and log calculated channels; (4) define and log events (e.g., high, low, outside range, inside range); (5) display data (e.g., in real time or historical data) in a HyperTrend, among others. In one embodiment, the HyperTrend is a user-interface component developed by National Instruments and available with its LabVIEW DSC, Lookout, and VI Logger products. The HyperTrend may support the viewing of both current and historical data retrieved from a database. The HyperTrend may allow the user to perform multiple tasks, such as browsing for data, displaying data in a chart, and submitting queries for breaks, minima, and maxima in a stream of data that has been logged to a database, among others.

Figure 5:
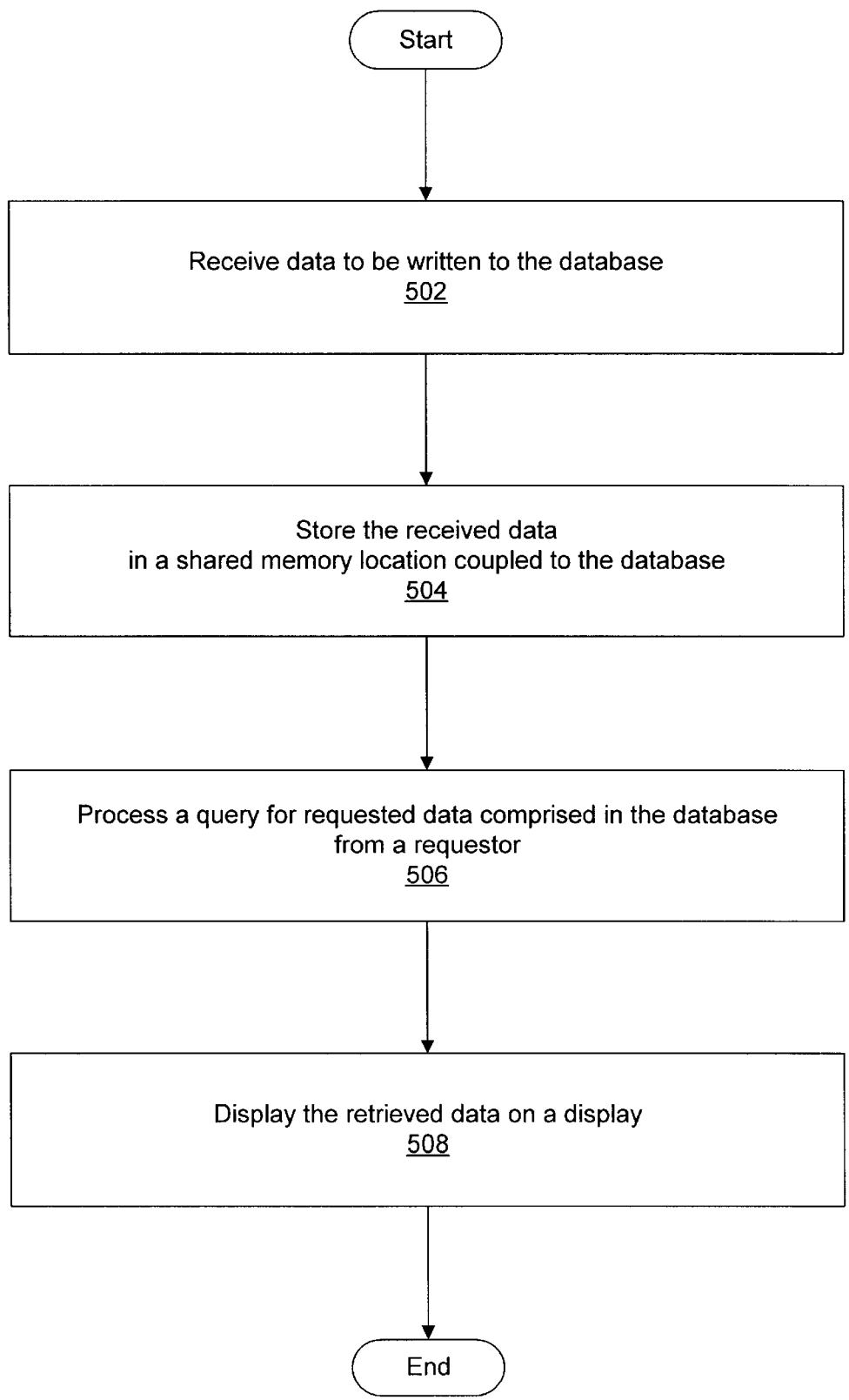
FIG. 5 is a flowchart illustrating a system and method for high speed logging and trending, according to one embodiment.

FIG. 5: High Speed Logging and Trending

FIG. 5 is a flowchart illustrating a system and method for high speed logging and trending, according to one embodiment.

In step 502, data desired to be written to a database may be received or logged. In one embodiment, the database may be stored on a non-volatile memory. The received data may be live data acquired from a data acquisition device. The received data may be received at a first user configurable frequency. The format of the received data may vary (e.g., waveform data, single-point data, alarm data, event data). The received data may be measurement data acquired from a measurement device. The received data may also be a stream of data comprising a plurality of entries.

In step 504, the received data may be stored in a shared memory location coupled to the database. Typically, the shared memory location is stored in a volatile memory. Storing the received data may include: storing the received data in the shared memory location, and storing an index to the received data, wherein the index is also stored in the shared memory location. An index, as used herein, is a unique key value (e.g., a non-negative integer) used to identify the location of data. In the case where the received data is a stream of data comprising a plurality of entries, the index corresponding to the stream of data may include an index for each of the plurality of entries as the entries are received and stored. A dynamic link library associated with the database may be used to store both the data in the shared memory location, and to store or update the index to the data. In one embodiment, the storing may occur at a user configurable frequency. The storing user configurable frequency may match the value of the receiving user configurable frequency, or may be a different value, as the user desires.

In step 506, a requester may submit a query for requested data from the database, and that query may be processed. The requested data may be a subset of the received data. The processing of the query may include: (1) receiving or generating the query for requested data; (2) determining the location of the requested data in the shared memory using the index of the requested data; (3) accessing the requested data from the shared memory; (4) providing the requested data to the requester. The requested data may be provided to the requester at a second user configurable frequency.

In step 508, the retrieved data or requested data may be presented on a display. The rate at which the retrieved data is displayed may be user configurable. For example, the retrieved data may be displayed at the same rate at which the data is provided, or at some alternate, user specified rate. In one embodiment, the logging and trending may be: performed substantially concurrently and/or implemented using one or more shared memory templates. Additionally, the logging and trending may be performed on a first computer system, with the first computer system also housing or storing the database, or the logging and trending may be performed on a second computer system coupled to the first computer system via a network.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method of operating a database, the method comprising:

(a) receiving data desired to be written to the database, wherein the database is stored on a non-volatile memory;

(b) storing the data in a shared memory location coupled to the database, wherein the shared memory location is comprised in a volatile memory, wherein said storing comprises:

storing the data in the shared memory location; and storing an index to the data, wherein said index is stored in the shared memory location; and (c) processing a query for requested data comprised in the database from a requestor, wherein said processing comprises:

receiving the query for requested data comprised in the database from the requestor;

determining the location of the requested data in the shared memory using the index of the requested data;

accessing the requested data from the shared memory; and providing the requested data to the requestor.

2. The method of claim 1, wherein the received data comprises live data acquired from a data acquisition device.

3. The method of claim 1, wherein the received data comprises one or more of: waveform data; single-point data, wherein single-point data comprises a data value and a data timestamp; alarm data; event data.

4. The method of claim 1, wherein the received data comprises measurement data acquired from a measurement device.

5. The method of claim 1, wherein the received data is received at a first user configurable frequency; and wherein the requested data is provided at a second user configurable frequency.

6. The method of claim 1, wherein said storing the data in the shared memory location further comprises:

a dynamic link library associated with the database storing the data in the shared memory location; and wherein said storing an index to the data further comprises the dynamic link library updating the index to the data.

7. A method of performing logging and trending of measurement data using a database, the method comprising:

logging first measurement data to the database, wherein said logging comprises:

receiving the first measurement data from a first measurement device, wherein the database is stored on a non-volatile memory;

storing the first measurement data in a shared memory location coupled to the database, wherein the shared memory location is comprised in a volatile memory, wherein said storing comprises storing the first measurement data in the shared memory location and storing an index to the first measurement data in the shared memory location; and trending second measurement data from the database, wherein the second measurement data is at least a subset of the first measurement data, wherein said trending comprises:

generating a query for the second measurement data comprised in the database;

determining the location of the second measurement data in the shared memory using an index of the second measurement data;

accessing the second measurement data from the shared memory; and displaying the second measurement data on a display.

8. The method of claim 7, wherein the first measurement data comprises a stream of data comprising a plurality of entries; and wherein said storing an index to the first measurement data comprises storing an index for each of the plurality of entries as said entries are received and stored.

9. The method of claim 7, wherein said logging and said trending are performed substantially concurrently.

10. The method of claim 7, wherein said logging and said trending are implemented using one or more shared memory templates.

11. The method of claim 7, wherein said database resides on a first computer system; and wherein said logging and said trending are performed on the first computer system.

12. The method of claim 7, wherein said database resides on a first computer system;

wherein said logging and said trending are performed on a second computer system; and wherein said second computer system is coupled to said first computer system via a network.

13. The method of claim 7, wherein the first measurement data comprises live data; and wherein the first measurement device is a data acquisition device.

14. The method of claim 7, wherein the first measurement data comprises one or more of: waveform data; single-point data, wherein single-point data comprises a data value and a data timestamp; alarm data; event data.

15. The method of claim 7, wherein the first measurement data is received at a first user configurable frequency; and wherein the second measurement data is displayed at a second user configurable frequency.

16. The method of claim 7, wherein said storing the first measurement data in the shared memory location further comprises:

a dynamic link library associated with the database storing the first measurement data in the shared memory location; and wherein said storing an index to the first measurement data in the shared memory location further comprises the dynamic link library updating the index to the first measurement data.

17. A method of operating a database, the method comprising:

(a) receiving user input indicating a first user configurable frequency for receiving, a second user configurable frequency for storing, and a third user configurable frequency for reading;

(b) receiving data desired to be written to the database, wherein the database is stored on a non-volatile memory, wherein the data is received according to said first user configurable frequency;

(c) storing the data in a shared memory location coupled to the database, wherein the shared memory location is comprised in a volatile memory, wherein the data is stored according to said second user configurable frequency, wherein said storing comprises:

storing the data in the shared memory location; and storing an index to the data, wherein said index is stored in the shared memory location; and (d) processing a query for requested data comprised in the database from a requestor, wherein said processing is performed according to said third user configurable frequency, wherein said processing comprises:

receiving a query for requested data comprised in the database from the requestor;

determining the location of the requested data in the shared memory using the index of the requested data;

accessing the requested data from the shared memory; and providing the requested data to the requestor.

18. The method of claim 17, wherein the first user configurable frequency for receiving and the second user configurable frequency for storing comprise a same value.

19. A method of performing logging and trending of measurement data on a first computer system, the method comprising:

a first application logging first measurement data to a shared memory location on the first computer system;

a second application trending the first measurement data from the shared memory location on the first computer system substantially concurrently as the first measurement data is logged to the shared memory location on the first computer system.

20. The method of claim 19, wherein said logging comprises:

receiving the first measurement data from a first measurement device;

storing the first measurement data in the shared memory location, wherein the shared memory location is comprised in a volatile memory, wherein said storing comprises storing the first measurement data in the shared memory location and storing an index to the first measurement data in the shared memory location.

21. The method of claim 19, wherein said trending comprises:

generating a query for the first measurement data comprised in the shared memory location;

determining the location of the first measurement data in the shared memory using the index of the first measurement data;

accessing the first measurement data from the shared memory; and displaying the first measurement data on a display.

* * * * *